United States Patent
Fallu et al.

[11] Patent Number: 5,964,328
[45] Date of Patent: Oct. 12, 1999

[54] TORQUE CONVERTER BYPASS CLUTCH HAVING A MODULAR SPRING DAMPER ARRANGEMENT

[75] Inventors: John William Fallu, Taylor; Fraser John MacDonald, Farmington Hills; Stephen Harold Henning, Novi, all of Mich.

[73] Assignee: Ford Global Techologies, Inc., Dearborn, Mich.

[21] Appl. No.: 08/890,539

[22] Filed: Jul. 9, 1997

[51] Int. Cl.⁶ .................................................. F16H 45/02
[52] U.S. Cl. .......................... 192/3.29; 192/212; 464/66
[58] Field of Search ................................. 192/3.28, 3.29, 192/212; 464/66

[56] References Cited

U.S. PATENT DOCUMENTS

| | | |
|---|---|---|
| 3,252,352 | 5/1966 | General et al. . |
| 3,541,893 | 11/1970 | Dyke et al. . |
| 4,301,900 | 11/1981 | Sunohara et al. . |
| 4,468,988 | 9/1984 | Hiramatsu . |
| 4,509,389 | 4/1985 | Vahratian et al. . |
| 4,560,043 | 12/1985 | Murasugi et al. . |
| 4,662,488 | 5/1987 | Hiramatsu et al. . |
| 5,209,330 | 5/1993 | MacDonald . |
| 5,383,540 | 1/1995 | MacDonald . |
| 5,590,750 | 1/1997 | Graton et al. ....................... 192/212 X |
| 5,682,969 | 11/1997 | Ling .................................... 192/212 X |
| 5,743,365 | 4/1998 | Makino ............................... 192/212 X |

*Primary Examiner*—Charles A Marmor
*Assistant Examiner*—Saúl J. Rodriguez
*Attorney, Agent, or Firm*—Frank G. McKenzie

[57] ABSTRACT

A hydrokinetic torque converter includes an impeller cover and bypass clutch located within the impeller housing. The impeller cover has welded to it a clutch plate, which carries friction material adjacent the clutch piston. The piston has legs that extend axially into engagement with helical springs carried in a damper assembly arranged in series with the damper between the impeller cover and the input shaft of the transmission. The springs are located in a retainer that accommodates two, three or four springs, as required by the torque requirements of the clutch and damper. The spring constant of the damper can be linear or piecewise linear over the full displacement range of the damper springs.

18 Claims, 3 Drawing Sheets

TORQUE CONVERTER BYPASS CLUTCH HAVING A MODULAR SPRING DAMPER ARRANGEMENT

BACKGROUND OF THE INVENTION

1. Field of the Invention

This invention relates to the field of automatic transmission torque converters, which hydrodynamically connect an impeller wheel and turbine wheel. The invention pertains particularly to a bypass clutch damper.

2. Disclosure Information

The transaxle described in U.S. Pat. No. 4,509,389, which is assigned to the assignee of this invention, includes a hydrokinetic torque converter having an impeller and a turbine. The housing for the impeller includes a lockup clutch assembly having a clutch plate that engages a friction surface on the impeller housing. The clutch plate carries friction material that establishes a frictional driving connection between the impeller and the turbine when the pressure differential across the clutch plate is sufficient to establish a clutch-engaging force.

The clutch plate is connected through a damper assembly to the hub of the turbine, thus establishing a mechanical torque transfer between an engine crankshaft and the turbine shaft, which bypasses the hydrokinetic torque flow path through the torque converter.

Converter lockup clutch constructions are well known in the art, an early prior art teaching being described in U.S. Pat. No. 3,252,352, which is assigned to the assignee of this invention. Another example of early prior art torque converter assemblies having a lockup clutch is disclosed in U.S. Pat. No. 3,541,893.

More recent prior art teachings include means for controlling the application of the torque converter clutch by means of an electronic controller that establishes a modification of the clutch engaging force under certain operating conditions, for example, during shifts when it is desired to eliminate undesired torque fluctuations and engine speed changes during transient periods when torque flow interruption is desired. The electronic controller establishes a pressure force on the clutch plate that is adequate to meet the transient torque transmission requirements of the driveline. Examples of this are shown in U.S. Pat. Nos. 4,560,043 and 4,301,900.

U.S. Pat. No. 3,541,893, which also is assigned to the assignee of this invention, includes a clutch capacity modulator valve that establishes a desired pressure in the clutch pressure control chamber defined by the impeller housing and the clutch plate. The controls for establishing the clutch capacity is intended to eliminate excess torque capacity so that the clutch will be maintained in the engaged condition under driving conditions when clutch engagement is desired, but excess clutch capacity is avoided by controlling the pressure differential across the clutch plate. This contributes to more precise lockup clutch control and eliminates undesired torque fluctuations upon clutch application and release.

It is also known in the prior art to effect a continuous slipping of a lockup clutch or bypass clutch for a hydrokinetic torque converter by continuously modulating the pressure that controls the clutch. An example of a continuously slipping bypass clutch, actuated by the pressure in the torus circuit of the converter, is disclosed in U.S. Pat. No. 4,468,988. Another example is disclosed in U.S. Pat. No. 4,662,488.

SUMMARY OF THE INVENTION

In the clutch assembly according to this invention, a clutch plate having a friction disc is located between a piston and an impeller casing. The piston is supported slidably on a hub, which is fixed to the turbine wheel and is provided with a surface that limits piston movement. The clutch plate is welded to the inner surface of the impeller casing.

The clutch may include one or more friction surfaces engaged by differential pressure across the piston, and may include multiple friction discs. In this way, the torque capacity of the clutch can be adjusted easily to match engine torque.

Annular pockets of circular cross section formed by arcuate flanges on the piston contain the damper springs and hold those springs in correct position against the effect of forces tending to urge the springs axially and radially outward as the springs are compressed. Due to the modular form inherent in the design, the number of damper springs, their length, and load-displacement relation can vary with kinematic requirements without changing the principle of operation. The damper springs are located at the radially outermost location within the torque converter casing, thereby minimizing the damper-spring force needed to attenuate torsional vibration. Because the spring pockets closely conform to the outer surface of the coiled springs, as the springs compress they move in contact on the inner surface of the pockets, which are hardened by heat treatment to withstand wear due to this. The resulting frictional contact produces coulomb damping in parallel with the spring force between the impeller cover and turbine wheel. When the clutch is engaged, the piston is driveably connected to the impeller casing and engine; therefore, the parallel arrangement of dampers and springs is active between the engine and turbine wheel.

Conventional prior art torque converter clutch dampers are mounted on the clutch piston, and torque is applied to the damper from tangs carried on the turbine. In the prior art, the drive plate that carries torque to the damper is driven radially. In the clutch/damper assembly of this invention, the damper is mounted on the turbine wheel, and the piston legs that carry torque to the damper are driven rotatably and are permitted to move axially as the bypass clutch is engaged by differential pressure across the clutch piston. The retainer pilots movement of the piston and limits its angular movement, the range of compressive displacement of the damper springs, by providing stop surfaces at several angularly spaced locations.

BRIEF DESCRIPTION OF THE DRAWINGS

FIG. 6 is a graph of the torque capacity vs. angular travel of a damper having first and second sets of springs installed.

DESCRIPTION OF THE PREFERRED EMBODIMENT

Figure 1:
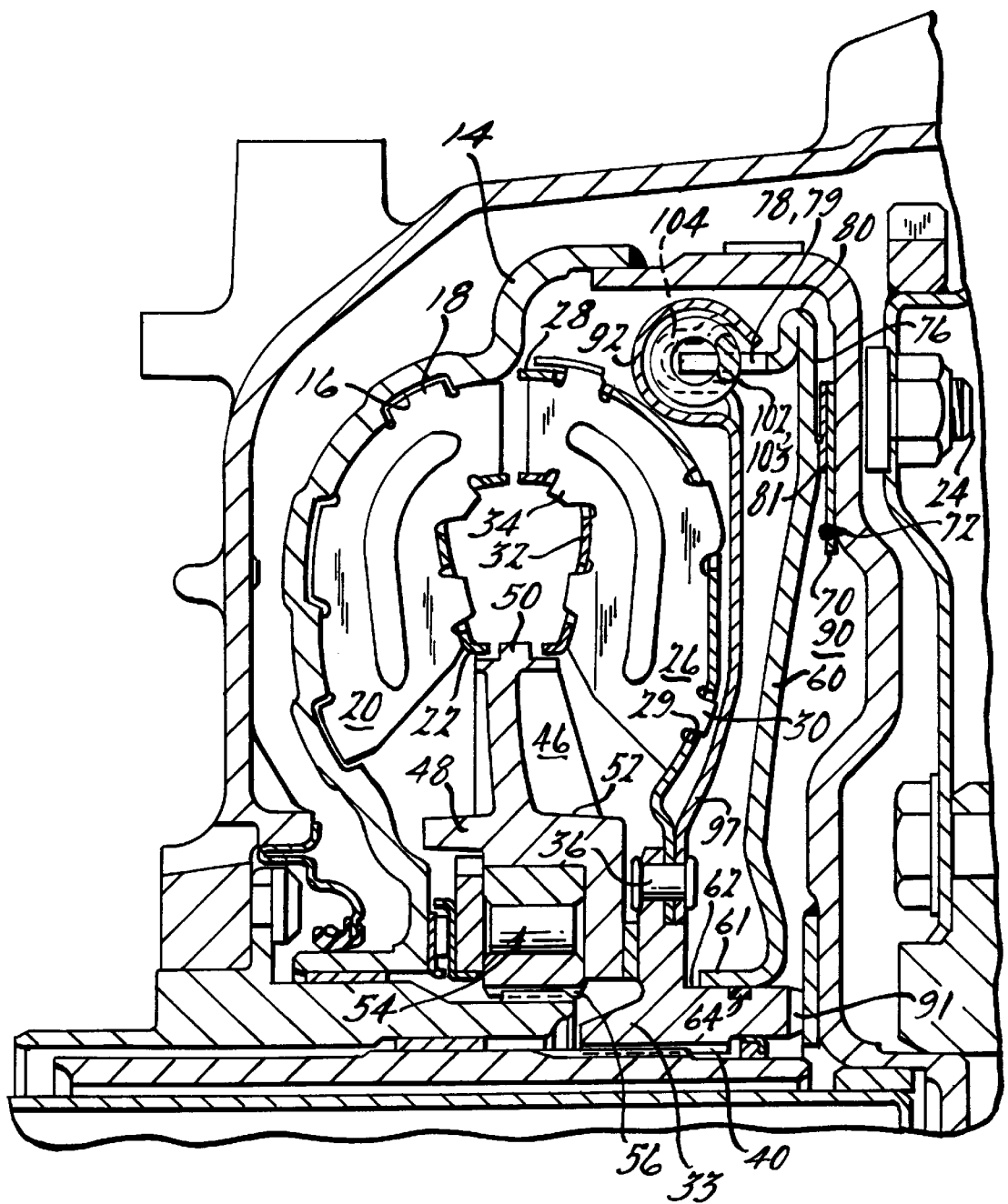
FIG. 1 is a side view of a torque converter, partially in cross section, showing a bypass clutch and damper according to the invention.

Referring first to FIG. 1, a torque converter 10 includes an impeller cover 12, which is welded to an impeller shell 14 having recesses 16, which receive tabs 18 located on the outer surface of impeller blades 20. The impeller blades are retained between shell 14 and an inner impeller shroud 22.

Impeller cover 12 supports a circular pattern of threaded studs 24 to which a flywheel, rotatably supported on the engine crankshaft, is bolted, thereby driveably connecting the cover to an engine.

Turbine blades 26 are spaced mutually about the axis of rotation and are located with respect to the impeller blades so that a toroidal fluid flow within the torque converter exits the impeller and enters the turbine at the radially outer area and leaves the turbine at the radially inner area. The outer periphery of the turbine blades is fixed mechanically or by welding or brazing to a turbine shell 28, which has openings 29 that receive tabs 30 formed on the turbine blades. The inner periphery of the turbine blades is connected to an inner turbine shroud 32 by locating tabs 34 within slots formed in shroud 32 and by bending the tabs over the inner surface of the shroud, thereby fixing the position of blades 26 between shell 28 and shroud 32. Turbine shell 28 is secured by rivets 36 to a turbine hub 38 having an internally splined surface 40 adapted to engage an externally splined surface on a transmission input shaft 42.

Located between the flow exit section of the turbine and the flow entrance section of the impeller is a stator assembly comprising stator blades 46, spaced mutually around the axis of rotation, a hub 48 supporting blades 46, an inner shroud 50 connecting the radially inner tips of the blades, and an outer shroud 52 connecting the radially outer ends of the stator blades. An overrunning brake 54, fixed by splines 56 to a stationary sleeve shaft 57, provides one-way braking between the stator blades 46 and the sleeve shaft.

A bypass clutch includes a piston 60 formed with a flange 61 that is slideably mounted on an axially directed surface 62 formed on turbine hub 38 and sealed against the passage of hydraulic fluid by an O-ring 64, located in a recess formed in surface 62.

A clutch plate 70 is fixed to the inner surface of impeller cover 12 by a spot weld 72, which provides a seal against the passage of hydraulic fluid between the axially outer surface of plate 70 and the adjacent inner surface of the cover. Clutch plate 70 and piston 60 are driveably connected due to mutual frictional engagement and through cover 12 to an engine crankshaft.

Clutch plate 70 and the outer face of piston 60 includes four axial legs 78, 79 spaced mutually angularly about the axis of rotation and directed toward the turbine wheel 26. The piston has a radial surface 76 that faces plate 70, which carries friction material 80 commonly referred to as "paper face" material, bonded to the axially opposite radial surface of plate 70 by a bonding technique described by Frosbie, Milek and Smith in SAE Design Practices, Vol. 5 (1962).

Piston 60 is formed with a deep hem 80 folded at about 180°, thereby permitting surface 76 to be in a radial plane and at a maximum radial distance from the axis. Each of the legs 78, 79 of piston 60 is located for contact with a damper spring, as described below.

Fluid circulates continuously across the friction surfaces during operation of the clutch as the clutch slips, thereby creating the maximum cooling effect. Heat transferred to the fluid is carried to a control system, where heat is transferred to ambient air through a cooler. Then, fluid is recirculated to the inlet side of a pump, which pressurizes the entire hydraulic system of the transmission. The pump supplies pressure to the control system, which establishes regulated pressure levels in the torus circuit of the torque converter and in chamber 90.

The turbine shroud 28 and a torque converter damper spring retainer 97 are joined to a radially extending flange of turbine hub 38 at a riveted connection 36. At the radially outer end of retainer 97, several arcuate spring retainer flanges 92, spaced angularly about the axis at intervals corresponding to the location and arcuate lengths of the damper springs 102, 103, are formed. Flanges define a substantially circular tubular cavity, in which are located four angularly spaced, helically-coiled damper springs 102, 103. Preferably, the two longer damper springs 102 are formed with an actuate shape; the two shorter springs 103 are formed straight and then bent to the contour of the arcuate flanges in which they are located. At four angularly spaced locations about the central axis of the torque converter, flange 92 of the damper support 97 is formed integrally with local stop flanges 104, adjacent pairs of stop flanges which define the extremities of annular pockets of the damper where each spring 102, 103 is located. Each stop flange provides a surface that stops an end of a spring from moving in response to displacement of the piston legs 78, which cause each spring to compress.

Piston 60 moves axially toward clutch plate 70 due to differential hydraulic pressure across the piston and away from the clutch plate as pressure within control chamber 90 rises in relation to pressure on the axially opposite side of the piston. Piston 60 also rotates about the axis when it is driveably connected to plate 70 because impeller cover 12 is connected to the engine crankshaft. This rotary movement of the piston forces two legs 78 into contact with springs 102 causing them to compress, store energy and dissipate energy due to contact of the spring on the inner surfaces of flanges 92.

Each of the axially directed legs 78, 79 of the piston 60 is located within a space located between angularly opposite ends of each of the damper springs. Engine torque is transmitted through piston 60 to the damper assembly by bearing contact between axial legs 78, 79 and the adjacent ends of the damper springs.

Figure 2:
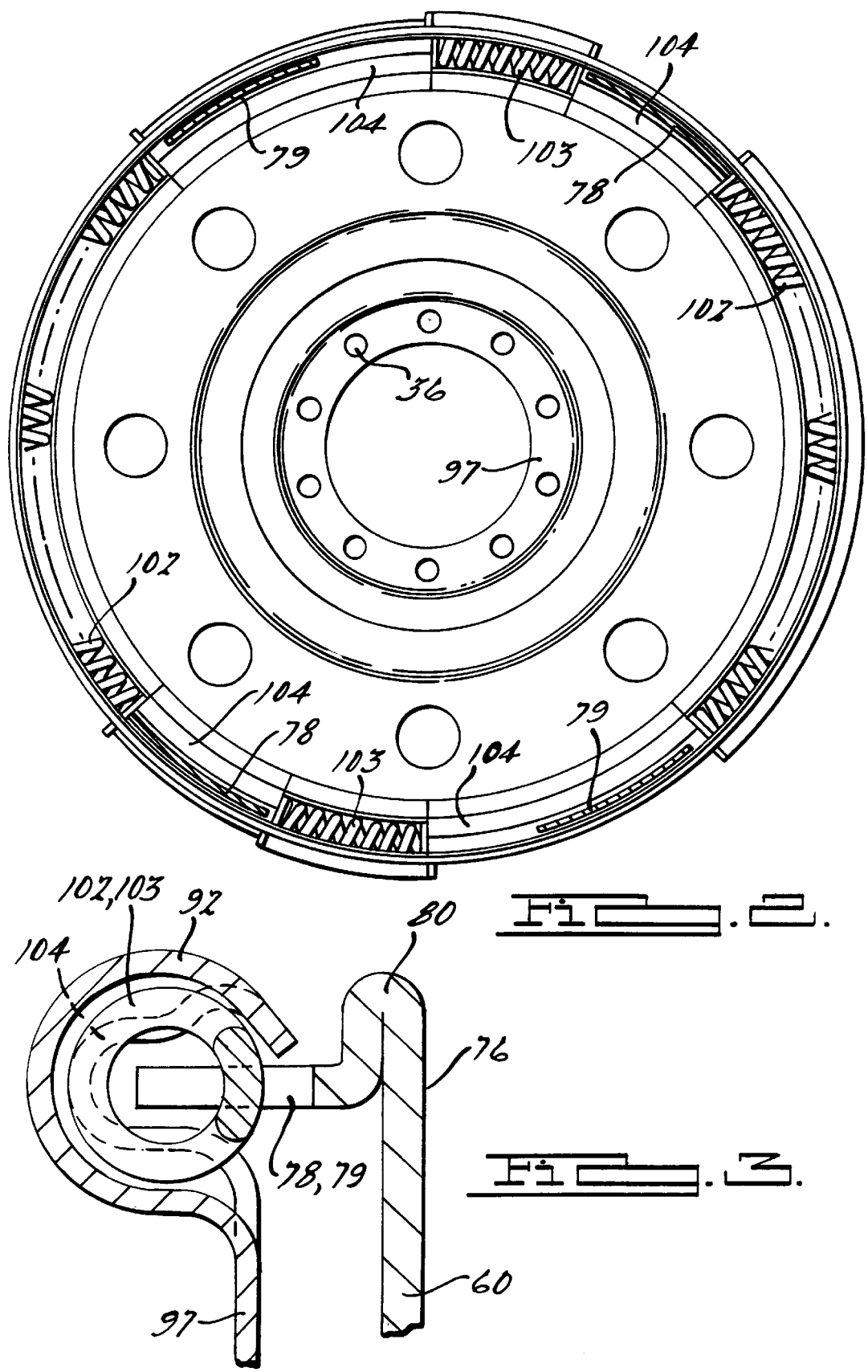
FIG. 2 is an end view of the damper assembly shown in FIG. 1.
Figure 3:
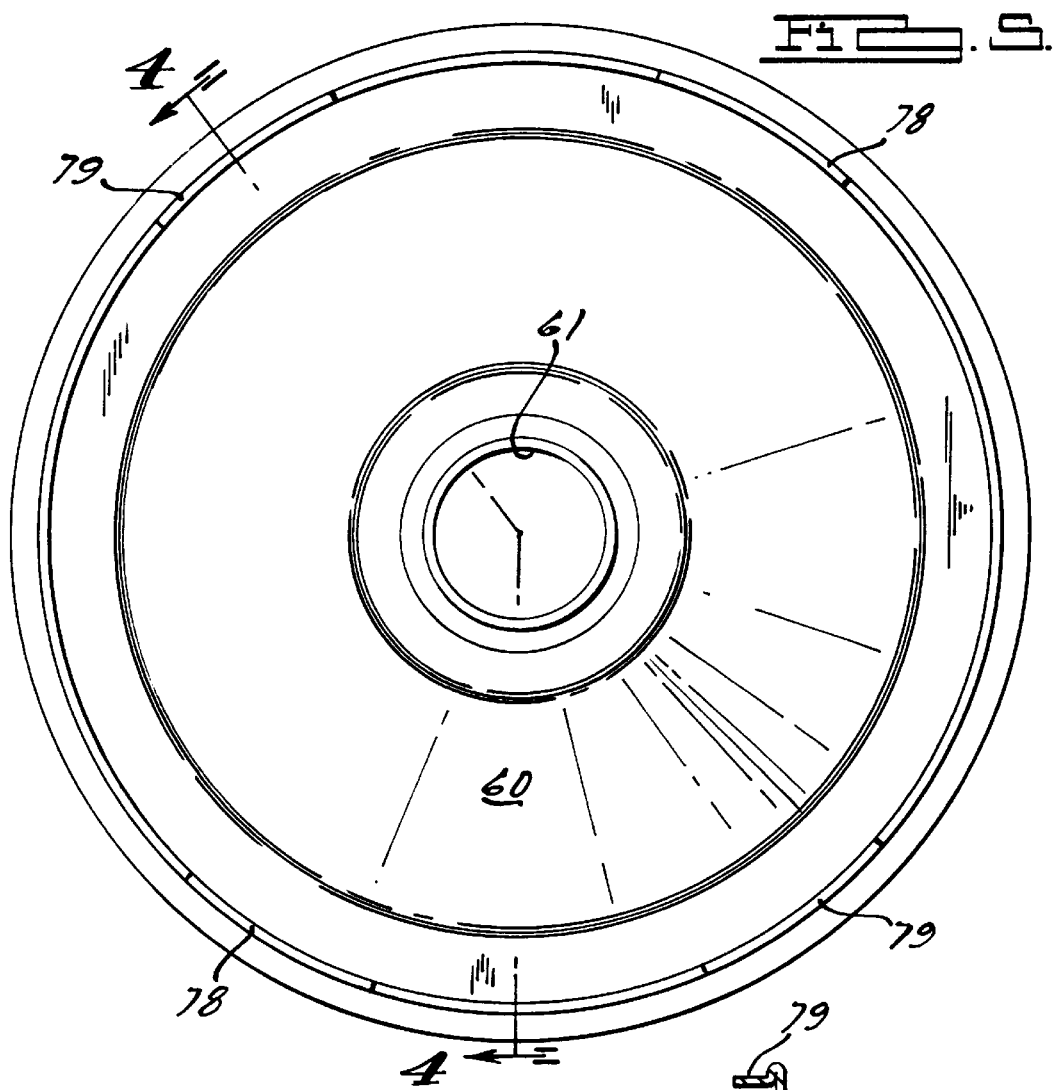
FIG. 3 is a cross section showing a detail of the spring retainer within the damper assembly.

When the damper is used with lower torque engines, only springs 102 are installed in the pockets of retainer flanges 92. When higher torque engines are used, the shorter torque converter damper springs 103 and the longer springs 102 are inserted into spring pockets between adjacent stop flanges 104, the positions shown in FIG. 2. Springs 102 are loaded by engine torque immediately when adjacent legs 78 contact the free end of spring 102, but springs 103 are loaded only later when legs 79 rotate clockwise through the angular range between springs 103 and the nearest end of legs 79. Therefore, when only springs 102 are used, a single spring load-displacement relation results and the spring constant is relatively low over the full range of spring displacement. However, when the damper contains springs 102 and 103, a first load-displacement relation and low spring constant results over the displacement range of springs 102 until legs 79 contact springs 103. Thereafter, a second load-displacement relation and a relatively higher spring constant results over the residual portion of the spring displacement range.

Figure 5:
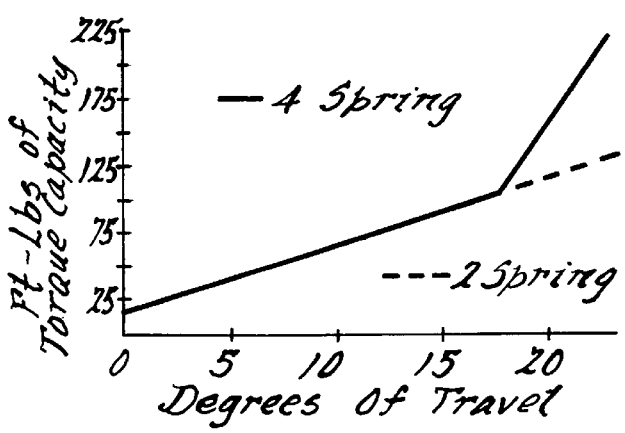
FIG. 5 is a front view of the clutch piston.
Figure 4:
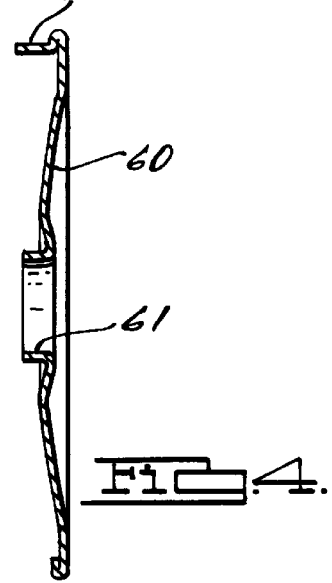
FIG. 4 is a cross section taken at plane 4—4 of FIG. 5 showing details of the clutch piston.

FIG. 5 shows spring 103 having a low spring rate (less than 7.38 N-M/degree or 10 ft-lbs/degree). In higher engine torque applications, springs 102 produce long travel and adequate isolation. In higher torque applications, springs 102 and 103 are used together to increase the torque capacity. Preferably torque producing rotation of about 17.5 degrees is carried by springs 102 before spring 103 begin their compression. Thereafter, the combined spring rate is greater than 14.76 N-M/degree or 20 ft-lbs/degree and the range of travel is 17.5–23.0 degrees. Spring 103 increases the torque capacity to 162.26 N-M/degree or 220 ft-lbs from the 95.88 N-M/degree 130 ft-lbs torque capacity with only springs 102 installed.

After the springs are installed in the retainer 97, flanges 92 are fully closed around the springs by a final pressing or curling operation, which fully retains the springs 102, 103 in a pocket whose inner surface is 2–3 mm smaller than the outside diameter of the springs. The pockets provide axial and circumferential spring retention. The portion of the retainer flanges 92 that does not surround the springs provides an access opening adapted to receive the piston legs 78, 79 therein. The legs contact the springs and pilot the function disc on the spring stop flanges 104.

The entire damper includes a one-piece, heat-treated stamped retainer 97, and two, three, or four springs 102, 103 without rivets or other fasteners.

Chamber 90, defined by piston 60, cover 12, clutch plate 70, and the friction material on drive ring 74, is a control pressure chamber, which communicates with the control pressure source, through a passage 91 in a manner described in U.S. Pat. No. 4,633,738, which is assigned to the assignor of this invention. By controlling pressure in chamber 90, a pressure differential across piston 60 can be controlled. The pressure in the torus flow cavity on the left-hand side of piston 60 forces the piston to slide on surface 62 rightward and causes the friction surfaces on clutch plate 70 and piston 60 to become frictionally engaged. By appropriately modulating the pressure in chamber 90, controlled slipping will occur between the cover and piston. Torque fluctuation developed in the driveline due to engine torque perturbations and other torque transmitting irregularities are modulated through operation of the damper assembly.

When pressure in chamber 90 is less than pressure in the torus cavity, piston 60 is forced rightward against clutch plate 70. Then the impeller cover 12, clutch plate, and piston turn in response to engine torque. The piston is then driveably connected through the damper assembly resiliently through the damper springs to retainer 97, via the attachment at rivets 36 to the turbine rotor, and through hub 38 to the transmission input shaft 42.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. In a torque converter that includes an impeller and a turbine driven hydrodynamically by the impeller, a damper assembly for modulating torque disturbances, comprising:
   an impeller casing adapted for driveable connection to an engine;
   a moveable piston supported on a turbine hub for alternate frictional driveable engagement with, and disengagement from the impeller casing, having legs spaced mutually about an axis;
   a retainer driveably fixed to the turbine hub, located adjacent the piston, having a retaining flange formed integrally with the retainer and extending annularly about a radially outer periphery thereof, the retaining flange defining first and second groups of annular pockets having unequal annular lengths, spaced mutually about the axis, having an opening facing the piston legs, and stop flanges located between successive pockets; and
   springs, each spring located in a pocket, having a first end contacted by a piston leg for displacement therewith, and a second end contacted by one of said stop flanges that limits displacement of the spring.

2. The damper of claim 1 wherein the springs include:
   a first set of helically coiled, annular curved compression springs, each spring located in a pocket of the first group, a piston leg located adjacent a first end of a spring of said first set that is displaced as the piston is driven by the impeller casing;
   a second set of helically coiled, compression springs, each spring located in a pocket of the second group, a piston leg located distant from a first end of a spring of said second set that is displaced as the piston is driven by the impeller casing.

3. The damper of claim 2 wherein the springs of the first and second spring sets each has an opposite end contacting one of said stop flanges.

4. The damper of claim 2 wherein each spring of the second set is substantially shorter than the springs of the first set.

5. The damper of claim 2 wherein each spring of the second set is a helically coiled straight spring.

6. The damper of claim 2 wherein the springs of the first set have a relatively low load-displacement relationship, the spring of the second set have a higher load-displacement relationship.

7. In a torque converter that includes an impeller and a turbine hydrodynamically driven by the impeller, a damper assembly for modulating torque disturbances, comprising:
   an impeller casing adapted for driveable connection to an engine;
   a moveable piston supported on a turbine hub for alternate frictional driveable engagement with, and disengagement from the impeller casing, having legs spaced mutually about an axis;
   a retainer driveably fixed to the turbine hub, located adjacent the piston, having a retaining flange formed integrally with the retainer and extending annularly about a radially outer periphery thereof, the retaining flange defining first and second annular pockets having a first annular length, and third and fourth annular pockets having a second annular length shorter than that of the first and second pockets, the first and second pockets spaced mutually about the axis at diametrically opposite locations, the third pocket located between the first and second pockets, the pockets having an opening facing the piston legs, stop flanges located between successive retaining flanges; and
   springs, each spring located in a pocket, having a first end contacted by a piston leg for displacement therewith, and a second end contacted by one of said stop flanges that limits displacement of the spring.

8. The damper of claim 7 wherein the springs include:
   a first set of helically coiled, annular curved compression springs, a first spring located in a first pocket, a second spring located in a second pocket, a piston leg located adjacent a first spring end of a spring of said first set that is displaced as the piston is driven by the impeller casing;
   a second set of helically coiled, compression springs, each spring located in a pocket of the second group, a piston leg located distant from a first spring end of a spring of said second set that is displaced as the piston is driven by the impeller casing.

9. The damper of claim 8 wherein each of the springs each has an opposite end contacting one of said stop flanges.

10. The damper of claim 8 wherein the third and fourth springs are each shorter than either of the first and second springs.

11. The damper of claim 8 wherein the third and fourth springs are each helically coiled and formed straight and then bent to the annular shape of the corresponding pocket.

12. The damper of claim 8 wherein the first and second springs have a relatively low load-displacement relationship, the third and fourth springs have a higher load-displacement relationship.

13. In a torque converter that includes an impeller and a turbine hydrodynamically driven by the impeller, a damper assembly for modulating torque disturbances, comprising:

an impeller casing adapted for driveable connection to an engine;

a moveable piston supported on a turbine hub for alternate frictional driveable engagement with, and disengagement from the impeller casing, having legs spaced mutually about an axis;

a retainer driveably fixed to the turbine hub, located adjacent the piston, having a retaining flange formed integrally with the retainer and extending annularly about a radially outer periphery thereof, the retaining flange defining first and second groups of annular pockets having unequal annular lengths, spaced mutually about the axis, having an opening facing the piston legs, stop flanges located between successive retaining flanges; and a first set of helically coiled, annular curved compression springs, each spring located in a pocket of the first group, a piston leg located for contact with a first end of the springs of the first set that is displaced as the piston is driven by the impeller casing;

a second set of helically coiled, compression springs, each spring located in a pocket of the second group, a piston leg located for contact with a first end of the springs of the second set that is displaced as the piston is driven by the impeller casing.

14. The damper of claim 13 wherein:

the first end of a spring of the first set of springs is located adjacent a piston leg; and a first end of a spring of the second set of springs is located distant from a piston leg.

15. The damper of claim 13 wherein the springs of the first and second spring sets each has an opposite end contacting one of said stop flanges.

16. The damper of claim 13 wherein each spring of the second set is substantially shorter than the springs of the first set.

17. The damper of claim 13 wherein each spring of the second set is a helically coiled straight spring.

18. The damper of claim 13 wherein the springs of the first set have a relatively low load-displacement relationship, the spring of the second set have a higher load-displacement relationship.

* * * * *